United States Patent
Bassett et al.

(10) Patent No.: US 11,185,804 B2
(45) Date of Patent: Nov. 30, 2021

(54) LATCH RESET FILTER UNIT

(71) Applicant: 3M INNOVATIVE PROPERTIES COMPANY, St. Paul, MN (US)

(72) Inventors: Laurence W. Bassett, Killingworth, CT (US); Andrew M. Candelora, East Haven, CT (US); Robert E. Astle, Middlefield, CT (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1109 days.

(21) Appl. No.: 14/933,687

(22) Filed: Nov. 5, 2015

(65) Prior Publication Data

US 2016/0059165 A1 Mar. 3, 2016

Related U.S. Application Data

(63) Continuation of application No. 12/739,530, filed as application No. PCT/US2008/079031 on Oct. 7, 2008, now abandoned.
(Continued)

(51) Int. Cl.
*B01D 35/30* (2006.01)

(52) U.S. Cl.
CPC .......... *B01D 35/306* (2013.01); *B01D 35/30* (2013.01); *B01D 2201/302* (2013.01);
(Continued)

(58) Field of Classification Search
CPC .............. B01D 35/30; B01D 2201/302; B01D 2201/4007; B01D 2201/4015;
(Continued)

(56) References Cited

U.S. PATENT DOCUMENTS

| | | | | |
|---|---|---|---|---|
| 2,955,712 A | * | 10/1960 | Gutkowski | .......... B01D 35/147 210/234 |
| 3,612,792 A | * | 10/1971 | Hinkelmann | .......... H01H 15/18 200/453 |

(Continued)

FOREIGN PATENT DOCUMENTS

WO    WO 2004/069376    8/2004

OTHER PUBLICATIONS

Aqua-Pure® by CUNO® a 3M Company, Installation and Operating Instructions for "AP Easy Full Flow Drinking Water Systems", INSTR2111 1105, 11 pages, © 2006 CUNO Incorporated.
(Continued)

*Primary Examiner* — Bobby Ramdhanie
*Assistant Examiner* — Denise R. Anderson
(74) *Attorney, Agent, or Firm* — 3M Innovative Properties Company

(57) ABSTRACT

A filter unit that includes a slide assembly and a head assembly. The slide assembly is moveably mounted to the head assembly. The head assembly is configured to receive an end portion of a filter cartridge in releasable engagement. The slide assembly is movable between a first position in which the slide assembly prevents disengagement of the filter cartridge from the head assembly, and a second position in which the filter cartridge is permitted to disengage from the head assembly. In the second position, the slide assembly maintains engagement with the head assembly until an external force is applied by engagement of the filter cartridge with the slide assembly when removing the filter cartridge from the head assembly.

9 Claims, 13 Drawing Sheets

Related U.S. Application Data

(60) Provisional application No. 60/983,469, filed on Oct. 29, 2007.

(52) U.S. Cl.
CPC ............... *B01D 2201/4007* (2013.01); *B01D 2201/4015* (2013.01); *B01D 2201/4046* (2013.01); *C02F 2201/006* (2013.01); *Y10T 29/49815* (2015.01)

(58) Field of Classification Search
CPC .......... B01D 2201/4046; B01D 35/306; C02F 2201/006; Y10T 29/49815
See application file for complete search history.

(56) References Cited

U.S. PATENT DOCUMENTS

| | | | |
|---|---|---|---|
| 3,900,401 A | 8/1975 | Oliver | |
| 4,419,234 A | 12/1983 | Miller | |
| 4,504,389 A | 3/1985 | Mills | |
| 4,522,717 A | 6/1985 | Brust | |
| 4,725,354 A | 2/1988 | Thomsen | |
| 4,857,189 A * | 8/1989 | Thomsen | B01D 27/08 210/232 |
| 4,882,049 A | 11/1989 | Davis | |
| 4,898,670 A | 2/1990 | Gollan | |
| 4,915,831 A * | 4/1990 | Taylor | B01D 35/30 206/1.5 |
| 5,132,009 A | 7/1992 | Futa, Jr. | |
| 5,336,406 A * | 8/1994 | Stanford | B01D 35/153 210/235 |
| 5,591,332 A | 1/1997 | Reid | |
| 5,601,717 A | 2/1997 | Villette | |
| 5,738,785 A | 4/1998 | Brown | |
| 5,771,885 A | 6/1998 | Putrello | |
| 5,976,362 A | 11/1999 | Wadsworth | |
| 6,001,249 A | 12/1999 | Bailey | |
| 6,123,837 A | 9/2000 | Wadsworth | |
| 6,162,271 A | 12/2000 | Bullinger | |
| 6,245,229 B1 | 6/2001 | Kool | |
| 6,299,661 B1 | 10/2001 | Bloomer | |
| 6,372,132 B1 | 4/2002 | Williams | |
| 6,458,269 B1 * | 10/2002 | Bassett | B01D 27/08 210/119 |
| 6,500,335 B2 | 12/2002 | Janik | |
| 6,533,930 B1 | 3/2003 | Kool | |
| 6,554,140 B2 | 4/2003 | Steger | |
| 6,716,343 B2 | 4/2004 | Kool | |
| 6,716,345 B2 | 4/2004 | Snyder | |
| 6,723,239 B2 | 4/2004 | Maxwell | |
| 6,726,839 B2 | 4/2004 | Taylor, Jr. | |
| 6,770,110 B1 | 8/2004 | Seifert | |
| 6,773,587 B2 | 8/2004 | Kool | |
| 6,793,818 B1 | 9/2004 | Entringer | |
| 6,811,691 B2 | 11/2004 | Woodard, Jr. | |
| 6,949,185 B2 | 9/2005 | Woodard, Jr. | |
| 7,166,216 B2 | 1/2007 | Woodard, Jr. | |
| 7,261,815 B2 | 8/2007 | Cur | |
| 7,628,280 B2 | 12/2009 | Mandt | |
| 2003/0019803 A1 | 1/2003 | Woodard, Jr. | |
| 2004/0079693 A1 | 4/2004 | Hacker | |
| 2004/0159600 A1 | 8/2004 | Stankowski | |
| 2004/0237488 A1 | 12/2004 | Stenersen | |
| 2005/0023206 A1 | 2/2005 | Fritze | |
| 2005/0103697 A1 | 5/2005 | Magnusson | |
| 2006/0006124 A1 | 1/2006 | Yates | |
| 2006/0021925 A1 | 2/2006 | Stifelman | |
| 2007/0199876 A1 | 8/2007 | Tubby | |
| 2009/0139923 A1 | 6/2009 | Pfitzer | |

OTHER PUBLICATIONS

Photograph of device #1 available prior to Oct. 29, 2007; 2 pages.
Photograph of device #2 available prior to Oct. 29, 2007; 1 page.
Photograph of device #3 available prior to Oct. 29, 2007; 1 page.
Photograph of device #4 available prior to Oct. 29, 2007; 2 pages.
Photograph of device #5 available prior to Oct. 29, 2007; 1 page.
Photograph of device #6 available prior to Oct. 29, 2007; 1 page.
Oxford Dictionary ("The Concise Oxford Dictionary", 10$^{th}$ ed. Judy Pearsall, pub. Oxford University Press, New York, 1999).
EP Appl. No. 08844576.2, Extended European Search Report, completed May 17, 2011.

\* cited by examiner

LATCH RESET FILTER UNIT

CROSS-REFERENCE TO RELATED APPLICATIONS

This application is continuation of U.S. Ser. No. 12/739,530, filed Apr. 23, 2010 as a national stage filing under 35 U.S.C. § 371 of PCT/US2008/079031, filed Oct. 7, 2008, which claims priority to Provisional Application No. 60/983,469, filed Oct. 29, 2007, the disclosures of which are incorporated herein by reference in their entireties.

TECHNICAL FIELD

The present disclosure generally relates to filtering systems and more particularly relates to attachment features of a filtering system.

BACKGROUND

Water filtration systems designed for residential and commercial use have become increasingly popular. The popularity arises from the need to remove unwanted substances from input water to make output water safer for consumption in various end uses. Filter systems may also be used to add substances to the output liquid, for example, minerals for taste enhancement.

Different engagement mechanisms can be used to retain the filter media in place until intentionally removed. During the course of use of water filtration systems, the filter itself can become particularly difficult to remove. When this occurs, the torque for removal or the "break out torque" of the engagement mechanism for the filter media exceeds what can be expended by one-hand operation. Improvements in the engagement and latching mechanisms allowing for two-hand operation in these situations would be an advance in the art.

SUMMARY

One aspect of the present disclosure relates to a filter unit. The filter unit includes a slide assembly comprising an actuator and spring. The slide assembly is moveably attached and contained within a collar assembly. The collar assembly is configured to receive an end portion of a filter cartridge in releasable engagement. The slide assembly is movable between a first position in which the slide assembly prevents disengagement of the filter cartridge from the collar assembly, and a second position in which the filter cartridge can be disengaged from the collar assembly. In the second position, the slide assembly engages the collar assembly in a way that the second position is maintained until an external force is applied. The external force can result from engagement of a portion of the slide assembly with a portion of the filter cartridge as the filter cartridge is being disengaged from the collar assembly.

The above summary is not intended to describe each disclosed embodiment or every implementation of the inventive aspects disclosed herein. Figures of the detailed description that follow more particularly describe features that are examples of how certain inventive aspects may be practiced. While certain embodiments are illustrated and described, it will be appreciated that the disclosure is not limited to such embodiments or arrangements.

DETAILED DESCRIPTION

Figure 1:
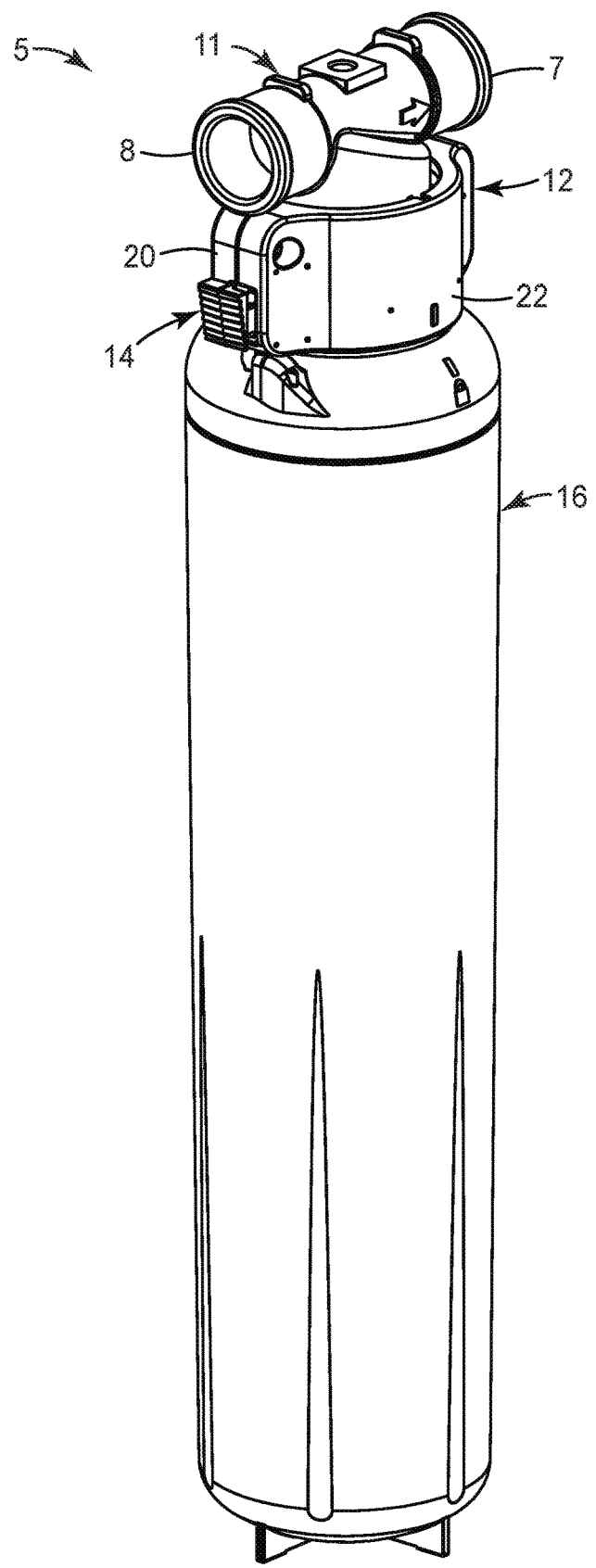
FIG. 1 is a schematic perspective view of an example filter unit in accordance with the principles of the present disclosure, the filter unit including a head assembly, a collar assembly, a slide assembly, and a filter cartridge.
Figure 2:
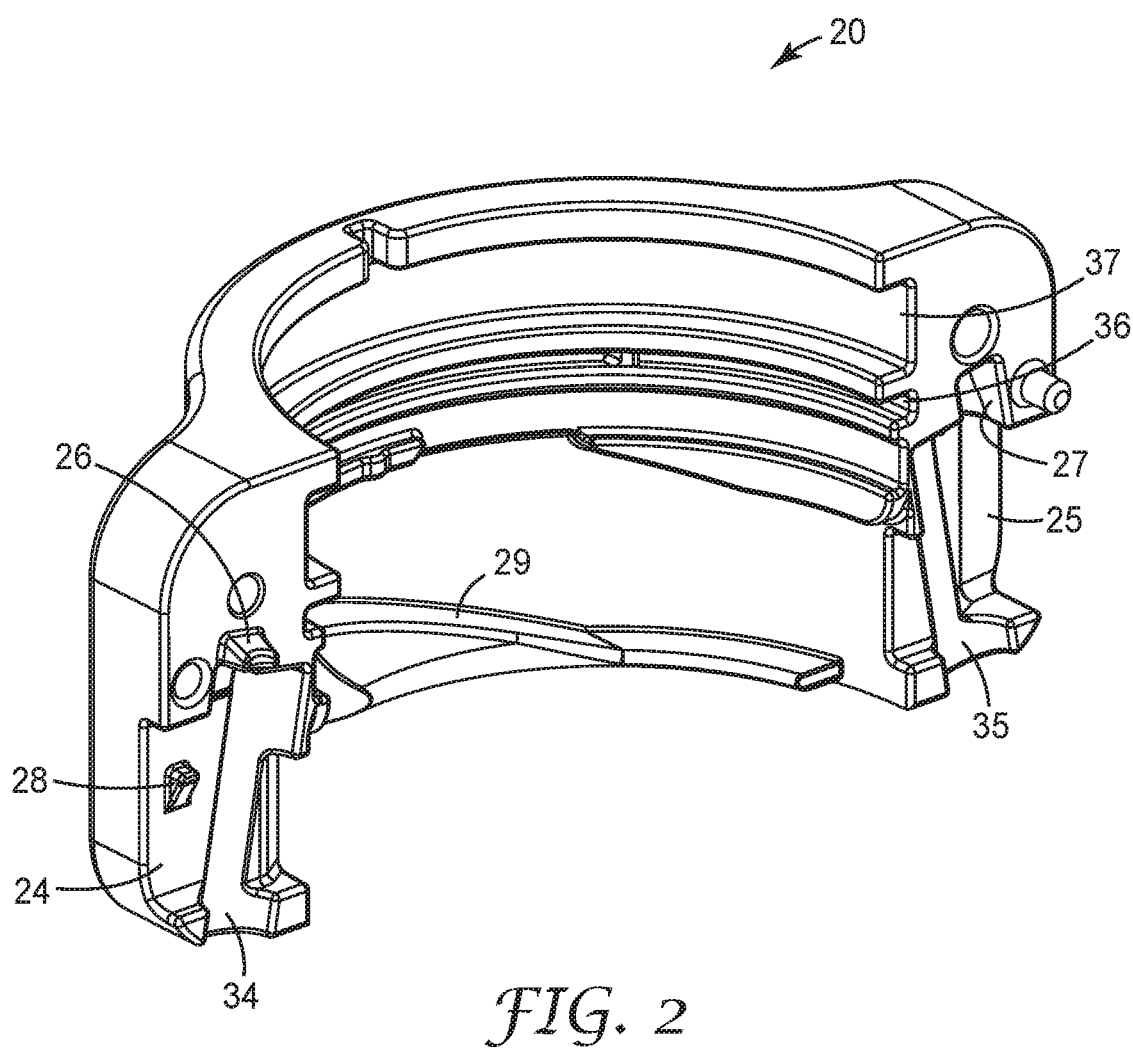
FIG. 2 is a schematic perspective view of a first collar member of the collar assembly shown in FIG. 1.
Figure 3:
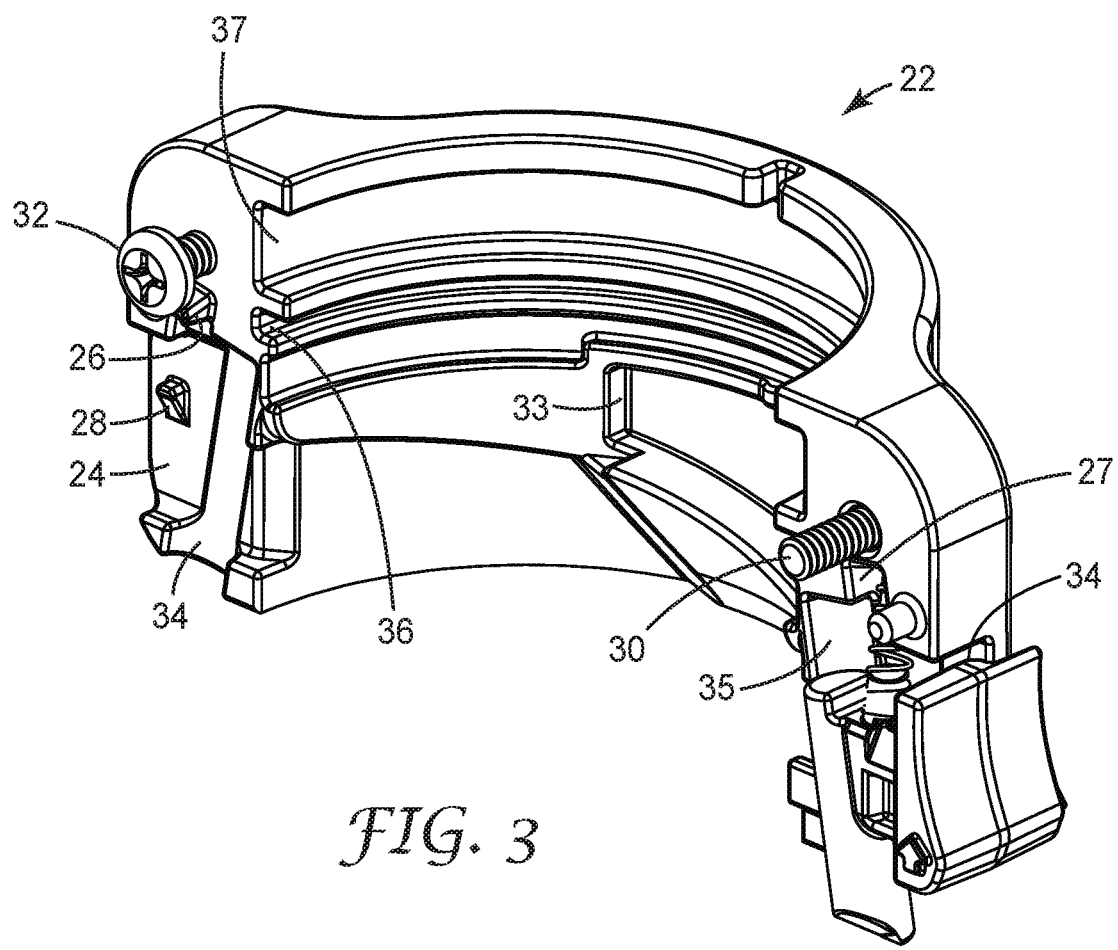
FIG. 3 is a schematic perspective view of a second collar member of the collar assembly shown in FIG. 1.

Various embodiments will be described in detail with reference to the drawings, wherein like reference numbers represent like parts in assemblies throughout the several views. Reference to various embodiments does not limit the scope of the claims attached hereto. Additionally, any examples set forth in this specification are not intended to be limiting and merely set forth some of the many possible embodiments for the appended claims.

The following discussion is intended to provide a brief, general description of a suitable environment in which the invention may be implemented. Although not required, the invention will be described in the general context of a filter unit, for example, a filter unit for filtering water for residential and commercial uses. The structure, creation, and use of some example filter units and methods are described hereinafter.

The example embodiments disclosed herein have wide application to a number of filter unit applications beyond the applications emphasized herein. Features for releaseably securing two bodies together have many applications in a variety of environments outside of a filter cartridge environment. While such alternative applications and environments are possible, emphasis is placed on the application of features for a filter unit application, as that particular application is particularly benefited from the embodiments described herein with reference to the attached figures.

The term "filter cartridge" as used herein, includes any device effective for separating a feed (input) liquid-containing substance into a product (output) liquid-containing substance of less undissolved solids and/or dissolved solids content than the feed liquid-containing substance and a filtrate or concentrate or permeate. The term "filter cartridge" includes a device that can add a substance to a feed (input) liquid-containing substance in the form of a modified product (output) liquid-containing substance. Thus non-limiting examples of filter means as used herein include activated carbon filters, permeable sediment filters, water softeners, filters that add polyphosphates for scale control, and reverse osmosis modules.

Some types of filter cartridges are maintained in an installed orientation relative to a mounting manifold or head assembly with some type of engagement mechanism. Such engagement mechanisms resist rotation and/or axial movement of the filter cartridge relative to the manifold unless the engagement mechanism is intentionally released. This resistance feature of such an engagement mechanism prevents the unintended release or removal of a filter, for example, under water line pressure. The amount of force required to remove a filter cartridge from the head assembly even when such an engagement mechanism is released can be best applied when an operator can grasp the filter cartridge with two hands. The applied rotational torque required to remove a filter cartridge from the manifold is sometimes referred to as the "break out torque." If the engagement mechanism must be held in an actuated (disengaged) position in order to release the cartridge, it can be difficult for the operator to maintain one hand releasing the engagement mechanism while using the other hand to apply the necessary break out torque (e.g., rotating/twisting forces) to the filter cartridge necessary to remove the filter cartridge from the head assembly.

The various filter unit examples described herein include a slide assembly that defines an engagement mechanism. The filter unit permits securing of the slide assembly in a latched configuration thereby permitting the operator to use two hands to grasp the filter cartridge when removing the filter cartridge from the manifold. Other aspects of the disclosed example filter units provides for automatic resetting of the slide assembly back into an unlatched position as part of the process of removing the filter cartridge from the manifold such that the head assembly is not occupied by a filter cartridge and the head assembly is prepared to receive a replacement filter cartridge.

The disclosed examples illustrate a filter unit that includes a plurality of engagement features on each of the filter cartridge, a collar assembly, and a slide assembly supported in the collar assembly. Some of the slide assembly features are movable relative to the collar assembly and the filter cartridge in a rotation direction, a radially inward direction, and an axial direction relative to a central axis of the filter unit. The slide assembly can be positioned in unlatched orientations as well as latched orientations. In each of the unlatched and latched orientations, the slide assembly features are arranged to engage different portions of the collar assembly and filter cartridge and or other components to provide the desired engagement functionality.

The Example Filter Unit Assembly of FIGS. 1-12

An example filter unit 5 is shown and described with reference to FIGS. 1-12. The filter unit 5 includes a head assembly 11, a collar assembly 12, a slide assembly 14, and a filter cartridge housing 16 (see FIG. 1). The slide assembly 14 is adjustably retained by the collar assembly 12. The slide assembly 14 can be removed from the collar assembly 12 by separating first and second collar members 20, 22 of the collar assembly 12. The head assembly 11 can be attached to a structural support, for example, a wall or pipe. The head assembly 11 typically includes an input 8 and an output 7. The input 8 and output 7 can be coupled in fluid communication to a water input line, a water output line, and an interior of the filter cartridge 16. An example filter assembly that includes a filter housing and collar assembly is described in U.S. Pat. No. 4,915,831 (Taylor), which patent is incorporated herein by reference.

The collar assembly 12 includes first and second collar members 20, 22, a slide recess 24 and a spring recess 26 that are defined in each of the first and second collar members 20, 22 (see FIGS. 2 and 3), a first latch protrusion 28, first and second fasteners 30, 32 and a slide pivot recess 34. The recesses 24, 26, 34 and protrusion 28 are configured to house or engage features of the slide assembly 14 as will be described in further detail below.

The collar assembly 12 further includes key ring engagement track feature 36 adapted for engagement with key ring 74 and head track engagement feature 37 for engagement with the head assembly 11. Typically, the collar assembly 12 is maintained in a fixed position relative to the head assembly 11. The filter cartridge 16 is secured to the collar assembly 12 via the engagement of the filter cartridge 16 with the ramp feature 29.

The first and second collar members 20, 22 include recess features 24, 34 and protrusion features 26, 28 at one end thereof, and a mating set of recess features 25, 35 and protrusion feature 27 at an on opposite end thereof. The recess features 24, 34 of the first collar member 20 and the recess features 25, 35 of the second collar member 22 define a cavity within which the slide assembly 14 is retained. The examples illustrated herein include a single slide assembly 14 mounted to the collar assembly 12. Other example configurations may include multiple slide assemblies 14 for each filter unit 5, depending upon the size and spatial need of the particular filter unit 5.

Figure 4:
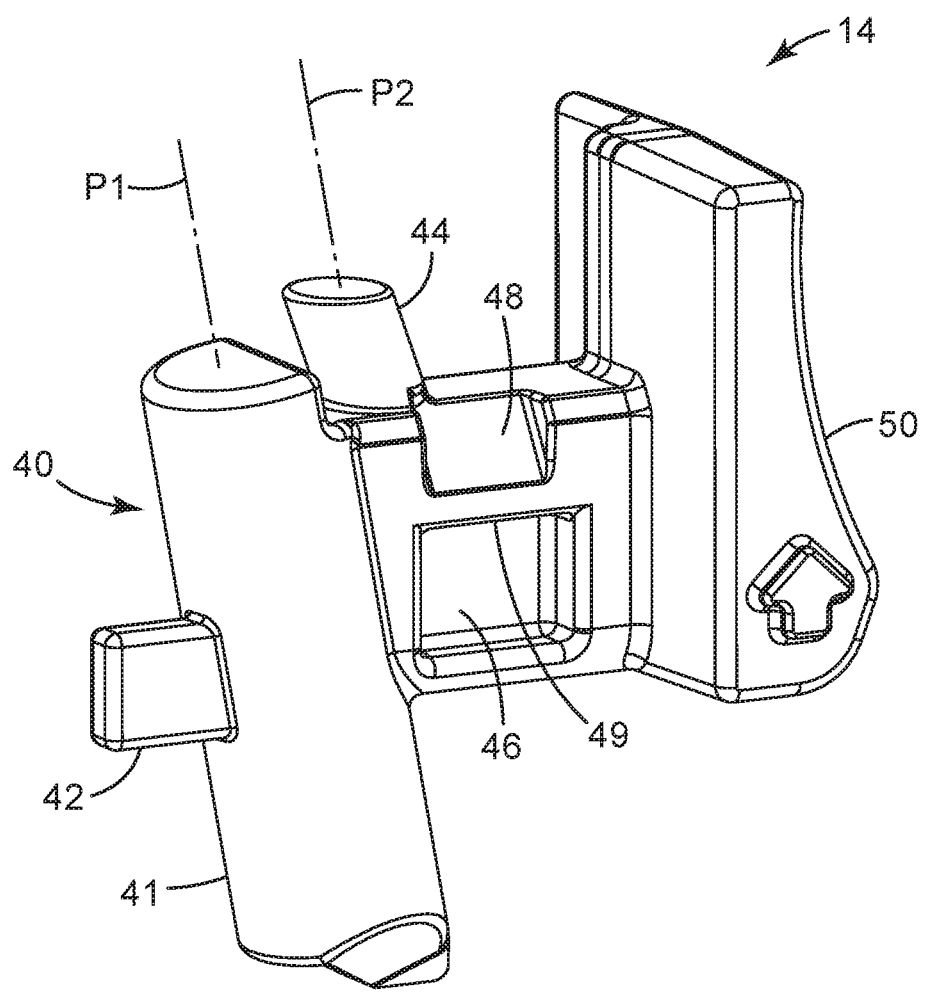
FIG. 4 is a schematic perspective view of the slide assembly shown in FIG. 1.
Figure 6:
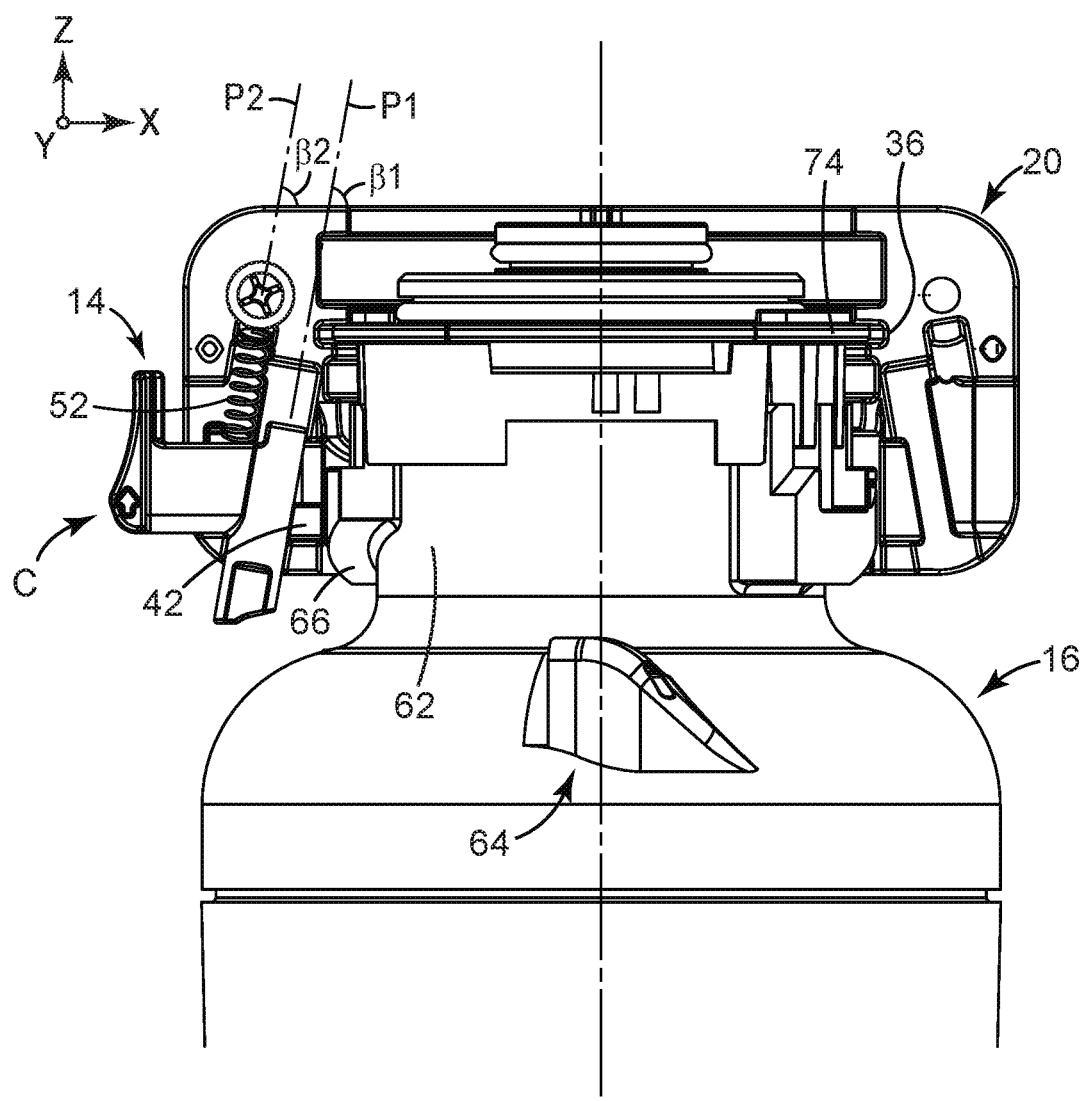
FIG. 6 is a side plan view of the filter unit shown in FIG. 1 with the head assembly removed, the second collar member removed, and the slide assembly in a first unlatched position.

The slide assembly 14 includes a pivot member 40 having an engagement extension 41, a reset latch protrusion 42 (also referred to herein interchangeably as reset protrusion 42, second latch protrusion 42, and second reset protrusion 42) extending from the pivot member 40, a spring retaining member 44, a latch recess 46, an engagement surface 49, and a ramp surface 48 (see FIG. 4). The slide assembly 14 further includes an actuator 50 and a spring 52. The slide assembly 14 pivots about a pivot axis P1 that passes through the pivot member 40 in a pivot unlatch direction P3 (see FIG. 11) and pivot latch direction P4 (see FIG. 12). The pivot axis P1 is arranged at an angle β1 relative to the XY plane as shown in FIG. 6. The pivot axis P1 is also arranged parallel with the XZ plane (see FIG. 7).

Figure 5:
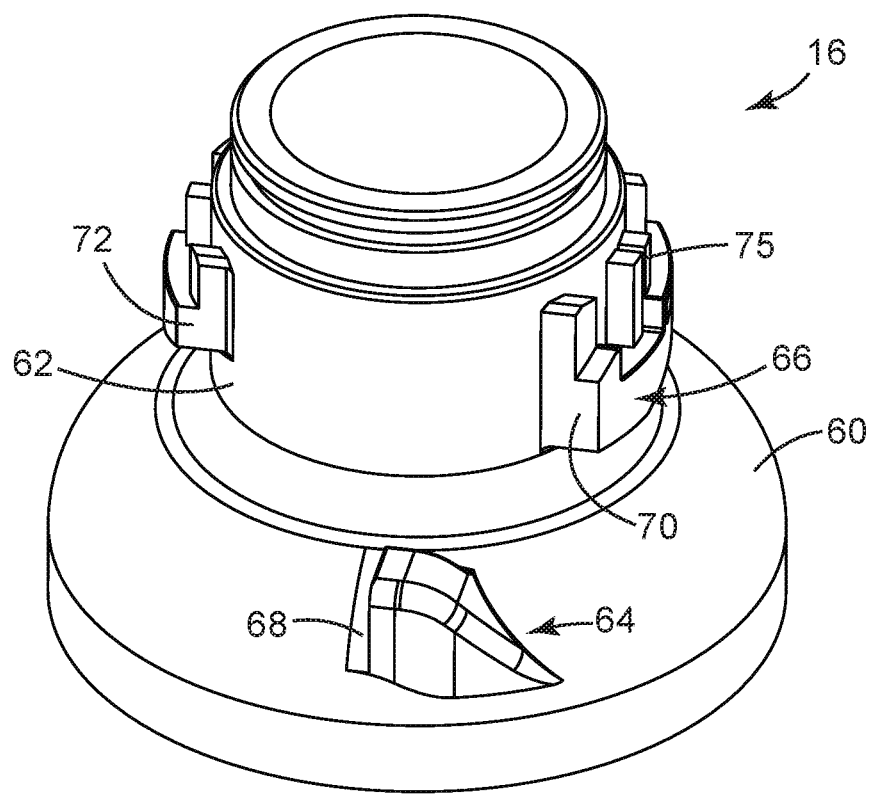
FIG. 5 is a schematic perspective view of a portion of the filter cartridge shown in FIG. 1.

The filter cartridge 16 includes a shoulder portion 60, a neck portion 62, a first ramp member 64 positioned on the shoulder portion 60, and a lug member 66 positioned on the neck portion 62 (see FIG. 5). The first ramp member 64 includes a shoulder portion 68. The lug member 66 includes a neck stop surface 70. A plurality of keyed surface formations 75 are also positioned on the neck portion 62. The key ring 74 is configured to engage the key ring engagement track feature 36 of the collar assembly 12 to provide engagement of the filter cartridge 16 with the collar assembly 12 via the mating keyed surface formations 75.

Figure 7:
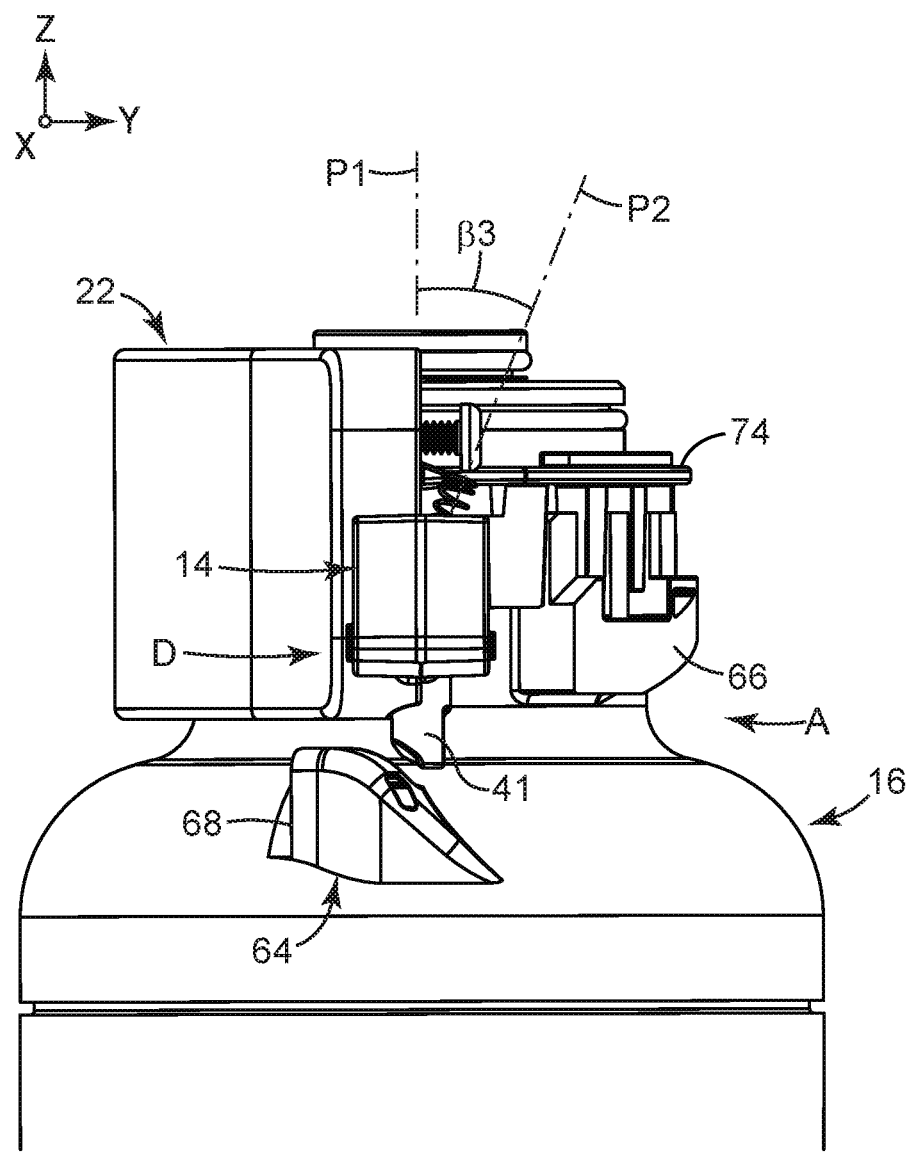
FIG. 7 is a schematic side view of the filter unit shown in FIG. 1 with the head assembly removed, the second collar member removed, and the slide assembly in a first unlatched position and the filter is in position to be installed.

A spring axis P2 passes through the spring retaining member 44 (see FIGS. 4, 6 and 7). Spring axis P2 is arranged at an angle β2 relative to the XY plane (see FIG. 6), and at an angle β3 relative to the XZ plane (see FIG. 7). The spring 52 is captured between the spring retaining member 44 and structure defining the spring recess 26 in the collar assembly 12. The spring 52 is oriented along the axis P2, thereby applying a biasing force to the slide assembly in a direction defined by angles β2, β3. The direction of the applied biasing force helps retain the slide assembly 14 in the first unlatched position C shown in FIG. 6 prior to the first latch protrusion 28 engaging the latch recess 46 of the slide assembly 14. After the first latch protrusion 28 of the collar assembly 12 is engaged in the latch recess 46, the direction of the biasing force applied by the spring 52 helps maintain engagement between the first latch protrusion 28 and the latch recess 46 to maintain the first latched position F shown in FIG. 9.

The angle β1 is typically less than about 80°, more preferably about 40° to about 80°, and more preferably about 60° to about 80°. In some arrangements, the angle β1 could be a negative angle in the range of about 0° to about −80°.

The angle β2 is typically less than about 90°, more preferably about 40° to about 90°, and more preferably about 60° to about 80°. In some arrangements, the angle β2 could be a negative angle in the range of about 0° to about −90°. In some arrangements, the angle β2 is equal with β1. The inherent flexibility of spring 52 permits unequal values for angles β1, β2 while still providing the desired biasing force to maintain engagement between the latch recess 46 and first latch protrusion 28.

The angle β3 is typically at least 15°. In some arrangements, the angle β3 is in the range of about 0° to about 80°, and more preferably about 15° to about 45°. In some arrangements, the angle β3 could be a negative angle in the range of about 0° to about −90°.

Figure 8:
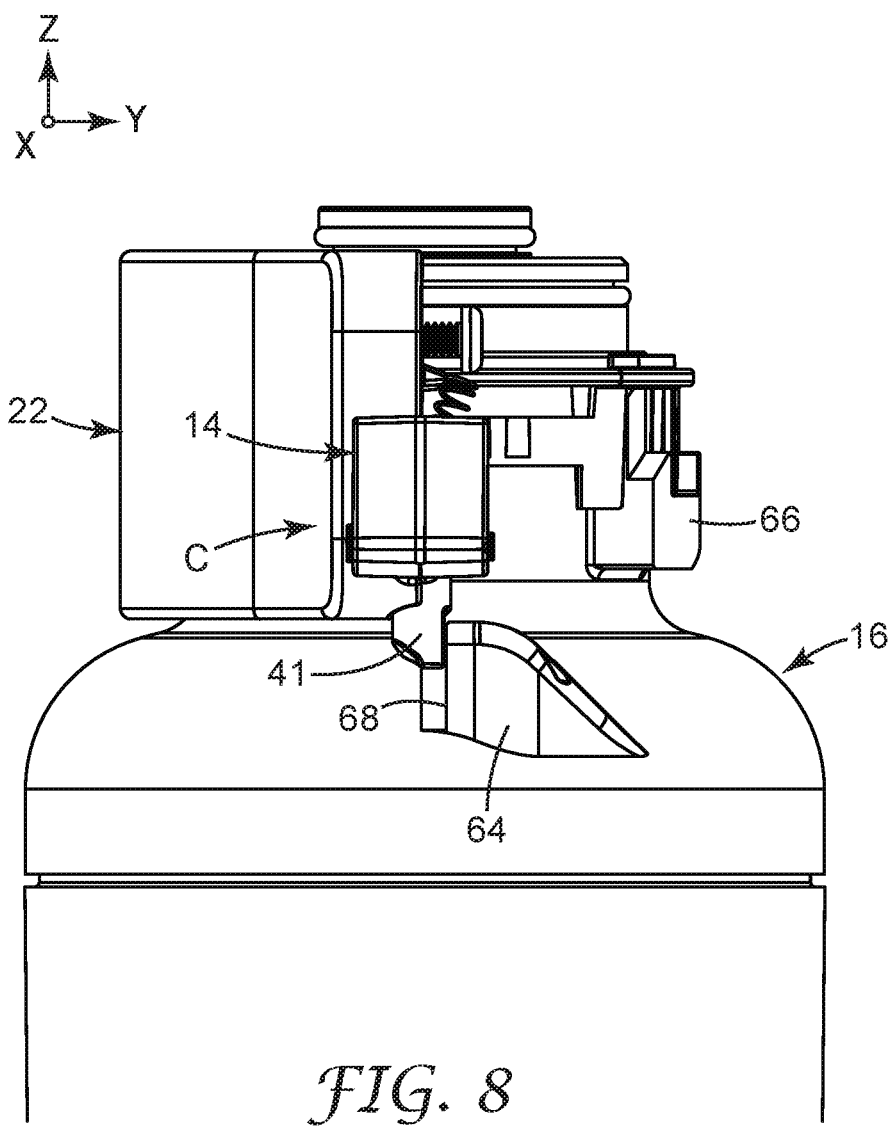
FIG. 8 is another schematic side plan view of the filter unit shown in FIG. 1 with the head assembly removed, the second collar member removed, and the slide assembly in the first unlatched position and the filter is installed and locked.
Figure 9:
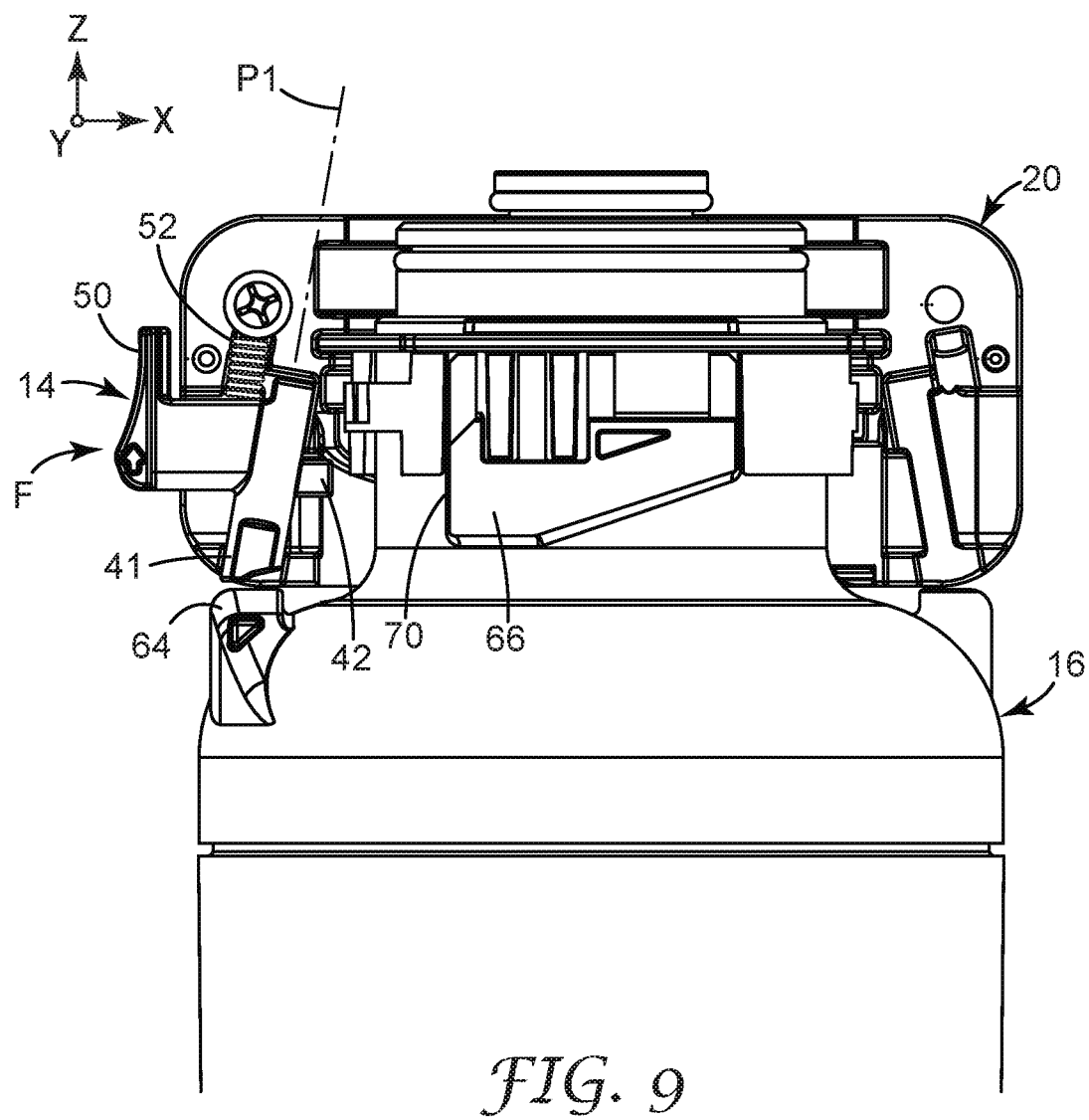
FIG. 9 is a schematic side view of the filter unit shown in FIG. 1 with the head assembly removed, the second collar member removed, and the slide assembly in second latched position allowing the filter to be uninstalled.
Figure 11:
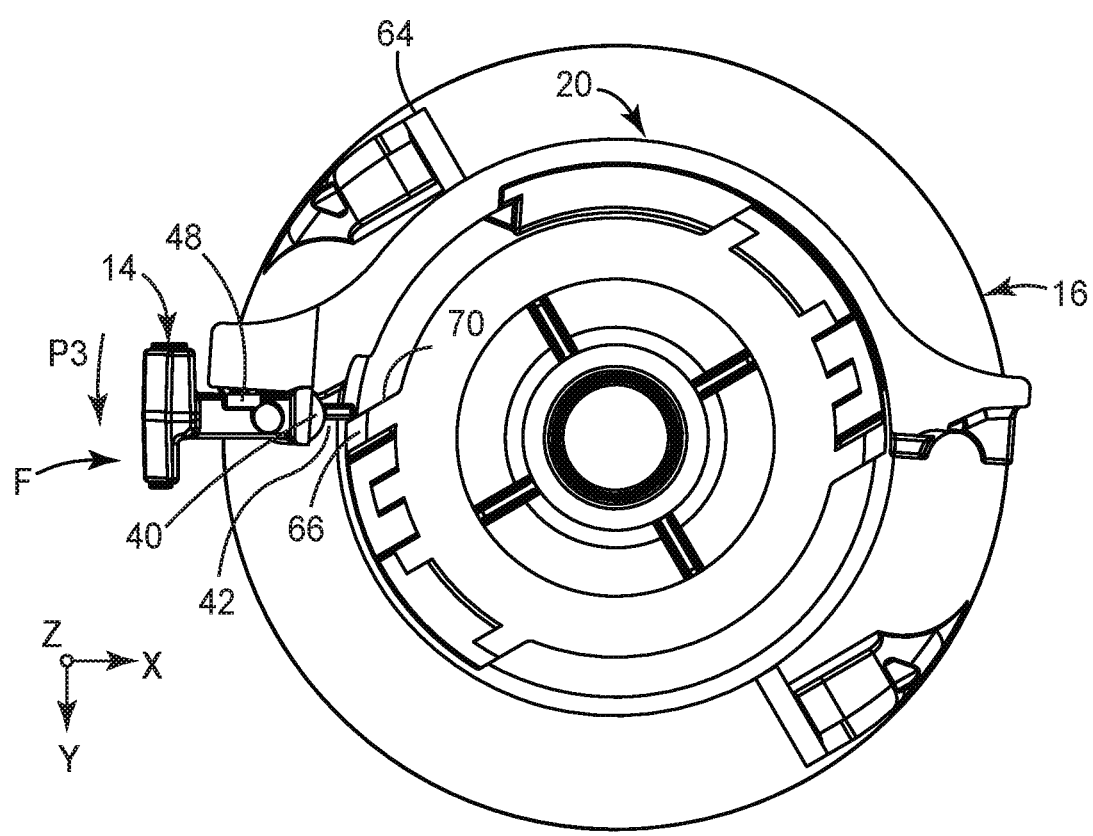
FIG. 11 is a schematic top view of the filter unit shown in FIG. 1 with the head assembly removed, the second collar member removed, and the slide assembly in the first latched position.
Figure 12:
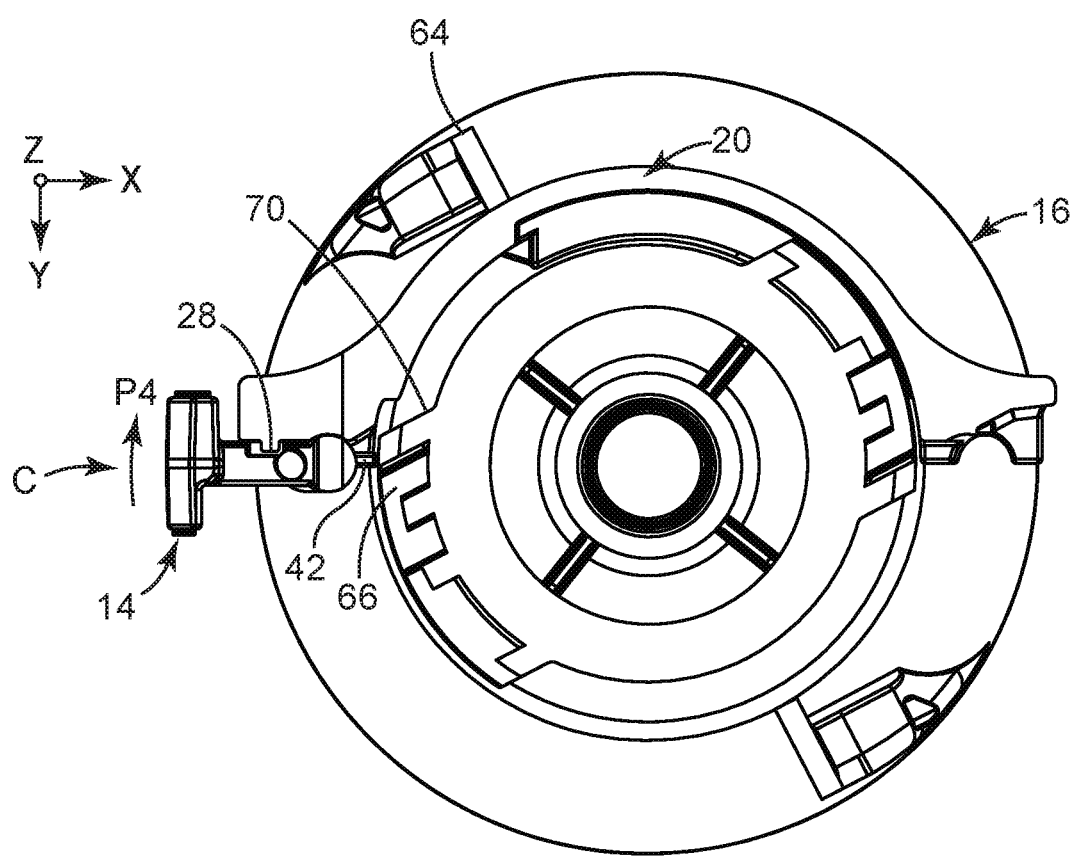
FIG. 12 is a schematic top view of the filter unit shown in FIG. 1 with the head assembly removed, the second collar member removed, and the slide assembly returned to the first unlatched position.

Movement of the slide assembly 14 along the axis P1 between the first unlatched position C shown in FIGS. 6, 8, and 12 and the second latched position shown in FIGS. 9 and 11 results in movement of the slide assembly 14 in each of the X, Y and Z directions relative to the collar assembly 12. Movement of the slide assembly 14 along the axis P1 changes a position of the reset protrusion 42 relative to engagement features of the filter cartridge 16 and changes a position of the latch recess 46 relative to the latch protrusion 28 of the collar assembly 12.

The slide pivot recess 34 is arranged coaxial with the pivot axis P1 that passes through pivot member 40. The pivot member 40 moves within the slide pivot recess 34, thus moving the slide assembly 14 in both the X and Z directions as the slide assembly 14 is moved between the first unlatched position C and the second latched position F. As the slide assembly 14 moves along the pivot axis P1, the slide assembly 14 must also rotate in the pivot release direction P3 and pivot latch direction P4 about the pivot axis P1 due to engagement between the first latch protrusion 28 (see FIG. 2) and the engagement surface 49 (see FIG. 4). Engagement of the first latch protrusion 28 with the engagement surface 49 as the slide assembly 14 moves along the pivot axis P1, causes the slide assembly 14 to rotate about the axis P1 until the first latch protrusion 28 engages within the latch recess 46 (see FIGS. 9 and 11).

An operator that actuates the slide assembly 14 from the first unlatched position C to the first latched position F engages the actuator 50 and applies a force in the Z direction. Applying a force in the Z direction moves the pivot member 40 along the pivot recess 34 at an angle β1. As the slide assembly 14 moves along the axis P1, the latch protrusion 28 engages ramp surface 48 of the slide assembly 14, thus forcing the slide assembly 14 to rotate about the pivot axis P1 within the XY plane in the rotation direction P3. At that point, the operator is actually applying a force to the actuator 50 that has a component in each of the X, Y and Z directions. The operator continues to apply this force in the X, Y and Z directions until the first latch protrusion 28 is engaged within the latch recess 46. In some instances, the operator must apply a rotational force in the P4 pivot direction when the slide assembly 14 has engaged a top surface of the latch recess to ensure engagement of the first latch protrusion 28 in the latch recess 46 even though the biasing force of the spring 52 tends to bias the slide assembly 14 in the pivot latch direction P4.

Referring now to FIGS. 6-12, a method of retaining the filter cartridge 16 engagement with the collar assembly 12 and slide assembly 14 is described. A description of how the filter cartridge 16 is disengaged from the collar assembly 12 and slide assembly 14 is also provided.

Referring first to FIG. 6, the neck portion 62 of the filter cartridge 16 is inserted in an axial direction into collar assembly 12 to initiate engagement between the key ring 74, the plurality of keyed surface formations 75 and ramp feature 29. Rotation of the filter cartridge 16 in the engagement direction A (see FIG. 10) advances the filter cartridge 16 in the Z direction relative to the collar assembly 12.

Initially, the slide assembly 14 is in the first unlatched position C. Biasing forces applied by the spring 52 along the spring axis P2 tend to maintain the slide assembly 14 in the first unlatched position C until another external force is applied to the slide assembly 14. FIG. 6 illustrates the reset protrusion 42 of the slide assembly 14 spaced radially outward from engagement with the lug member 66 of the filter cartridge 16. In the first unlatched position C, the first latch protrusion 28 is positioned vertically above (in the Z direction) the ramp surface 48 and is not in engagement with the latch recess 46.

Referring now to FIG. 7, the filter cartridge 16 is rotated in the engagement direction A until the latch extension 41 of the pivot member 40 of the slide assembly 14 engages the first ramp member 64 of the filter cartridge 16. Engagement between the latch extension 41 and first ramp member 64 moves the slide assembly 14 in the XZ direction along the axis P1 into the second unlatched position D. In the second unlatched position D, the first latch protrusion 28 engages with the ramp surface 48, thus rotating the slide assembly 14 in the direction P3 about the pivot axis P1. The slide assembly 14 is not moved vertically in the Z direction far enough for the first latch protrusion 28 to engage within the latch recess 46. Thus, after slightly further rotation of the filter cartridge 16 relative to the collar assembly 12 in the direction A, the latch extension 41 moves over the first ramp member 64 and into engagement with the shoulder 68 (see FIG. 8). The movement of slide assembly 14 in the Z direction into engagement with the shoulder 68 can occur automatically under biasing forces applied by the spring 52.

Figure 10:
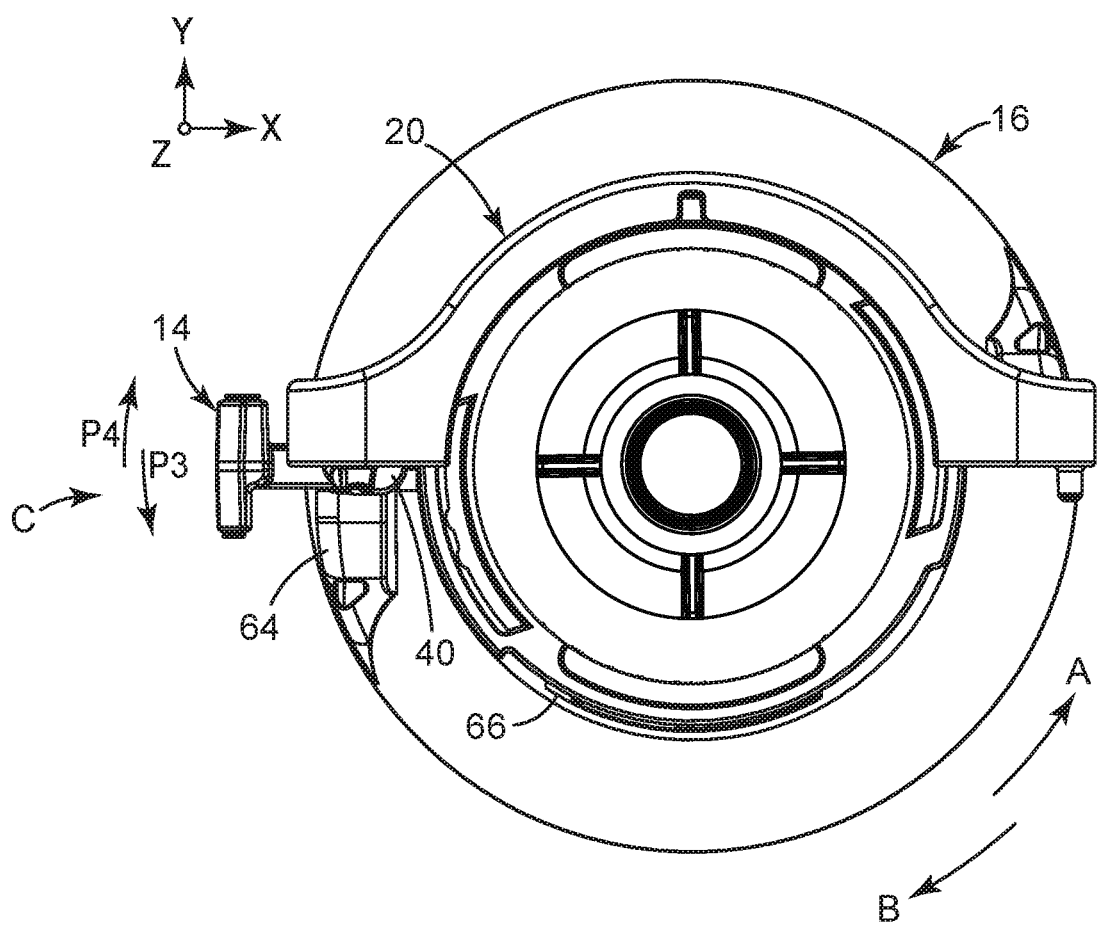
FIG. 10 is a schematic top view of the filter unit shown in FIG. 1 with the head assembly removed, the second collar member removed, and the slide assembly in the first unlatched position.

Due to the offset positions of the first ramp member 64, and the lug member 66 around a circumference of the filter cartridge 16, the second latch protrusion 42 can freely move in the X direction without engaging the lug member 66 while the latch extension 41 moves over the first ramp member 64 and into engagement with the shoulder 68. With the latch extension 41 in engagement with the shoulder 68, the filter cartridge 16 cannot be rotated in a disengagement direction B (see FIG. 10) to disengage the key rings 74 from the plurality of keyed surface formations 75 and to disengage the filter cartridge 16 from the collar assembly 12. In the position shown in FIG. 8, a lug member stop surface 72 (see FIG. 5) contacts a collar stop surface 33 (see FIG. 3), thereby limiting further rotation of the filter cartridge 16 relative to the collar assembly 12 in the engagement direction A. FIG. 10 is a top view illustrating the latched orientation shown in FIG. 8, wherein the slide assembly 14 is in the first unlatched position C with the latch extension 41 is in engagement with the first ramp member 64 of the filter cartridge 16.

Removing the filter cartridge 16 from the collar assembly 12 is initiated by manually moving the slide assembly 14 along the pivot axis P1 in the XZ direction until reaching the third unlatched position E, wherein the slide assembly 14 is at the top end of the latch recess (see FIG. 9) and the first latch protrusion 28 is not engaged in the latch recess 46. The third unlatched position can be maintained by one hand of the operator while a second hand of the operator is used to rotate the filter cartridge 16 in the direction B to disengage the key ring 74 from the key ring engagement track features 36 until the filter cartridge 16 is removed from the collar assembly 12.

Alternatively, the slide assembly 14 can be moved in the pivot direction P4 shown in FIG. 10 while the slide assembly 14 is in the third unlatched position E to engage the first latch protrusion 28 within the latch recess 46 to establish the first latched position F shown in FIG. 9. With the slide assembly 14 in the first latched position F, the latch extension 41 is positioned vertically above the first ramp member 64 in the Z direction thereby permitting rotation of the filter cartridge 16 relative to the collar assembly 12 in the direction B.

In some arrangements, the slide assembly 14 can maintain the first latched position F until the operator manually rotates the slide assembly 14 in the pivot release direction P3 to disengage the first latch protrusion 28 from the latch recess 46. Alternatively (as shown), the second reset protrusion 42 is provided on the slide assembly 14 to initiate an automatic release of the slide assembly 14 from the first latched position F back into the first unlatched position C.

As shown in FIG. 9, the second reset protrusion 42 is positioned further radially inward in the X direction towards the filter cartridge 16 neck portion 62 as compared to the position of second latch protrusion 42 when in the first unlatched position C shown in FIG. 6. Referring now to FIG. 11, while the slide assembly 14 is maintained in the first latched position F and the filter cartridge 16 is rotated in direction B, the second reset protrusion 42 engages the neck surface 70 of the lug member 66. Still further rotation of the filter cartridge 16 in the direction B applies a force to the second reset protrusion 42 that rotates the slide assembly 14 about the pivot axis P1. This action causes the latch recess 46 to rotate away from latch protrusion 28. Once the first latch protrusion 28 is moved out of the latch recess 46, the biasing forces applied by spring 52 forces the slide assembly 14 back into the first unlatched position C (see FIG. 12). With the slide assembly 14 in the first unlatched position C, the second latch protrusion 42 is moved radially outward in the X direction to disengage the second latch protrusion 42 from the neck stop surface 70, thereby permitting further rotation of the filter cartridge 16 in the direction B until the filter cartridge 16 is removed from the collar assembly 12.

Movement of the slide assembly 14 along the axis P1 (e.g., from the first unlatched position C to the second unlatched position D) can be considered translational movement. Movement about axis P1 (e.g., movement from the third unlatched position E to the latched position F) can be considered rotational movement. The slide assembly 14, when being moved between the first unlatched position C and the latched position F experiences both translational and rotational movement.

The slide assembly 14, having been automatically reset into the first unlatched position C, is now prepared for receiving a replacement filter cartridge 16. If the slide assembly 14 were to remain in the latched position F, the second reset protrusion 42 would interfere with the neck stop surface 70 (see FIG. 9) when installing the replacement filter housing thereby preventing installation of the replacement filter cartridge 16. The automatic reset features of the slide assembly 14 can better ensure that the consumer is able to properly install the replacement filter housing. If the consumer inadvertently actuates slide assembly 14 into the latched position F after the filter cartridge 16 has been removed, the second reset protrusion 42 would interfere with the neck stop surface 70 (see FIG. 9). However, when the consumer removes the filter cartridge 16 in direction B the automatic reset features of the slide assembly are actuated and proper installation of the filter cartridge 16 is permitted.

The slide assembly 14 is configured to move primarily within the XZ plane between the first unlatched position C and the latched position F. In other examples (not shown), the slide assembly 14 can be arranged to move primarily in the YZ plane, in the XY plane, or any plane arranged at angles relative to the XZ, YZ, and XY planes. Furthermore, the illustrated example provides for movement of the slide assembly 14 into the latched position F by moving generally in the Z direction along the axis P1 generally away from the filter cartridge 16. In other arrangements, the slide assembly 14 can be arranged to move in an opposite direction generally towards the filter cartridge 16 to attain the latched position F.

The slide assembly 14 is shown in the Figures mounted primarily to the collar assembly 12 of the head assembly 11. In other arrangements, the slide assembly 14 can be mounted to other features of the head assembly 11. Although the two-piece construction of the collar assembly 12 provides some advantages in capturing the slide assembly 14 in a mounted position in the head assembly 11, other constructions and arrangement are possible for the slide assembly 14 and head assembly 11 to permit mounting of the slide assembly 14 in different ways while providing the desired latching functions. In still further arrangements, at least some aspects of the slide assembly 14 can be mounted to the filter cartridge 16. In still further arrangements some aspects of the first ramp member 64 (such as the shoulder stop portion 68) can be alternatively mounted on the key ring 74 while maintaining essentially the similar locking function of the filter cartridge 16.

Figure 13:
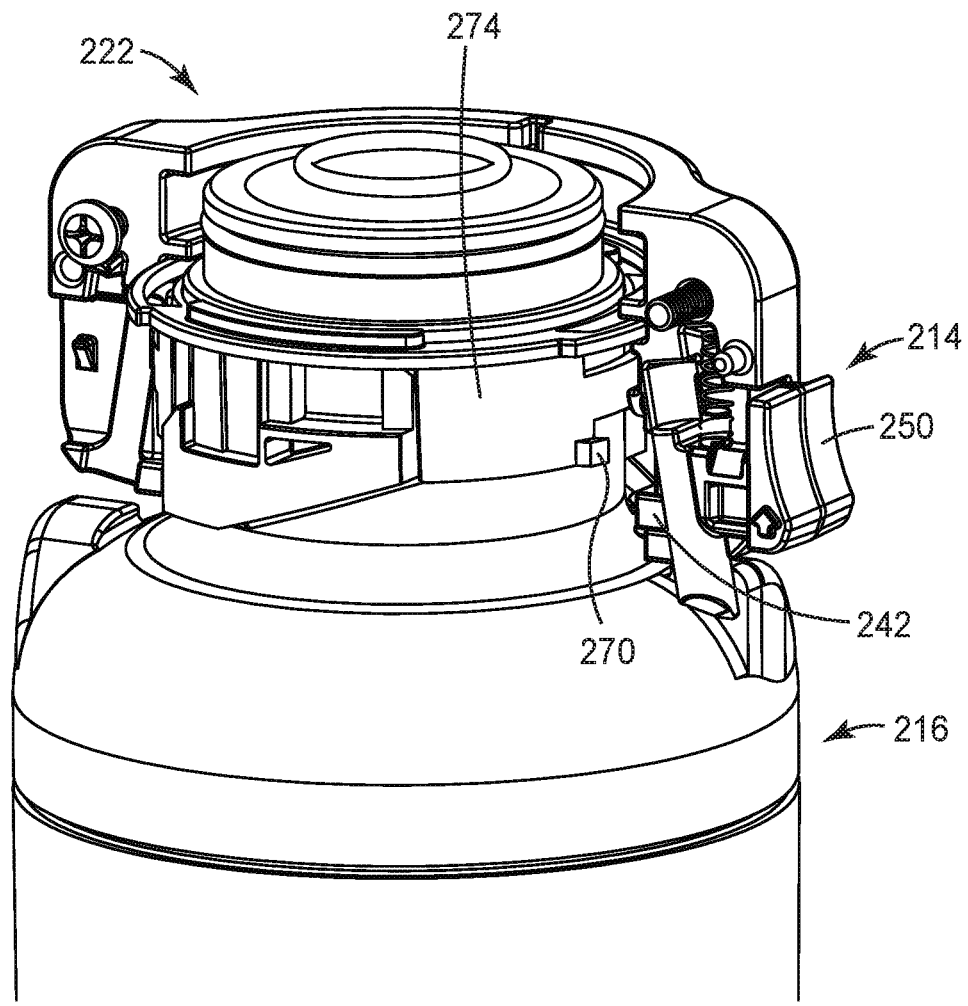
FIG. 13 is a schematic perspective view of another example filter unit with the head assembly removed, the second collar member removed and the latch protrusion positioned on the key ring.

The Example Filter Unit Assembly of FIG. 13

The example filter unit assembly illustrated in FIGS. 1-12 has the stop surface 70 on lug member 66. FIG. 13 illustrates another embodiment whereby a stop surface 270 is on a key ring 274, replacing the stop surface 70 described in the previous embodiment in FIGS. 1-12. The stop surface 270 functions similar to the stop surface 70, wherein rotation of a filter cartridge 216 results in a second reset protrusion 42 of a slide assembly 214 engaging the stop surface 270. A primary difference between the stop surfaces 70, 270 is the location of the stop surface 270 compared to the location of the stop surface 70.

Other embodiments of the present disclosure include filter units having stop surfaces, reset protrusions, and other features described herein used in conjunction with rotary valves, other valve members, and further filter unit features that rotate with or without the filter cartridge when mounting a filter cartridge to a head assembly, such as those features described in U.S. Pat. No. 6,458,269 (Bassett et al.), which is incorporated herein by reference in its entirety.

CONCLUSION

One aspect of the present disclosure relates to a filter unit that includes a filter cartridge, a slide assembly, and a head assembly. The slide assembly includes a spring, and a first latching member. The head assembly includes a latch recess and a second latching member and is configured to receive a filter cartridge in releasable engagement. The latch recess is configured to receive at least a portion of the slide assembly, and the second latching member is configured to releaseably engage the first latching member. The slide assembly is movable by translational and rotational movement between a latched position in which the first and second latching members are engaged and the filter cartridge is permitted to rotate relative to the head assembly, and a unlatched position wherein the first and second latching members are disengaged and the slide assembly engages the filter cartridge to limit rotational movement of the filter cartridge relative to the head assembly. The latch assembly can further include a third reset member. The third latching member is arranged and configured to engage the filter cartridge during rotation of the filter cartridge when the slide assembly is in the latched position. Engagement of the third latching member with the filter cartridge disengages the first and second latching members.

Another aspect of the present disclosure relates to a filter unit that includes a filter cartridge, a head assembly, and a slide assembly. The head assembly includes a first latching member. The slide assembly includes a second latching member. The filter cartridge is releaseably mounted to the head assembly. The slide assembly is configured to move between a first position in which the filter cartridge is held in a fixed axial and rotational position relative to the head assembly, and a second position in which the filter cartridge is moveable axially and rotationally relative to the head assembly. The slide assembly is also configured to maintain the second position by engagement of the first and second latching members until the slide assembly engages the filter cartridge at a predetermined rotated position of the filter cartridge relative to the head assembly to disengage the first and second latching members prior to removing the filter cartridge from engagement with the head assembly.

A further aspect of the present disclosure relates to a method of detaching a filter cartridge from a filter cartridge head assembly. The head assembly includes a slide assembly and is movable between a latched position and an unlatched position. The filter cartridge includes first and second stop members. The method includes moving the slide assembly from the unlatched position wherein the slide assembly engages the first stop member to restrict rotation of the filter cartridge relative to the filter cartridge head assembly, into the latched position in which the slide assembly is disengaged from the first stop member to permit rotation of the filter cartridge relative to the head assembly. The method also includes engaging a first latch member of the slide assembly with a second latch member of the head assembly to retain the latch assembly in the latched position, rotating the filter cartridge in a release direction relative to the head assembly until the second stop member engages the slide assembly to disengage the first and second latch member to provide movement of the latch assembly from the latched position to the unlatched position, and further rotating the filter cartridge in the release direction until the filter cartridge is removed from the head assembly.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment. Therefore, the sphere and scope of the appended claims should not be limited to the description of the preferred versions contained herein.

We claim:
1. A filter unit, comprising:
a filter cartridge;
a head assembly comprising an input and an output;
a collar assembly engaged with the head assembly, the collar assembly comprising a first and a second collar member that define a slide recess, a first latch protrusion in the slide recess, and a ramp feature;
a slide assembly located in the slide recess comprising a pivot member having pivot axis, an engagement extension a spring retaining member having a spring axis, and a latch recess,
the filter cartridge being releaseably mounted to the head and the collar assembly, the slide assembly being configured for translational and rotational movement between a first position in which the filter cartridge is held in a fixed axial and rotational position relative to the head assembly, and a second position in which the filter cartridge is moveable axially and rotationally relative to the head assembly, the slide assembly being configured to maintain the second position by engagement of the first latch protrusion and the latch recess until the slide assembly engages the filter cartridge at a predetermined rotated position of the filter cartridge relative to the head assembly to disengage the first latch protrusion and the latch recess prior to removing the filter cartridge from engagement with the head assembly; and
wherein the filter cartridge comprises;
a filter and a longitudinal axis extending in a Z direction;
a shoulder portion;
a neck portion extending from the shoulder portion;
a first lug portion positioned on the neck portion, the first lug portion having a ramp surface facing the shoulder portion, the ramp surface engageable with the ramp feature to retain the filter cartridge in the head and collar assembly, the first lug portion having a neck stop surface extending longitudinally in the Z direction, and the first lug portion having a keyed surface formation extending longitudinally on the neck portion in the Z direction; and
a first ramp member positioned on the shoulder portion, the first ramp member having a ramp extending from the shoulder portion and ending in a shoulder stop portion and
wherein in the first position rotational movement of the filter cartridge about the longitudinal axis is prevented by contact of the engagement extension with the shoulder stop portion of the first ramp member.

2. The filter unit of claim 1, wherein the slide assembly further comprises a second latch protrusion extending from the pivot member, which is configured to engage the filter cartridge at the predetermined rotated position.

3. The filter unit of claim 1, wherein the slide assembly further includes comprises a spring that engages with the spring retaining member, the spring being arranged to bias the slide assembly into the second position.

4. The filter unit of claim 3, wherein the spring is arranged to bias the latch recess and the first latch protrusion into engagement with each other when the slide assembly is in the first position.

5. The filter unit of claim 1 wherein the shoulder stop portion of the first ramp member is positioned radially less than 90 degrees about the longitudinal axis from the neck stop surface of the first lug portion.

6. A filter cartridge comprising:
 a filter cartridge housing containing a filter and a longitudinal axis extending in a Z direction through the filter cartridge;
 a shoulder portion;
 a neck portion extending from the shoulder portion;
 a first lug portion and a second lug portion positioned on the neck portion, the first and second lug portions opposing each other, the first and second lug portions each having a ramp surface facing the shoulder portion, the first and second lug portions each having a neck stop surface extending longitudinally in the Z direction, and the first and second lug portions each having a keyed surface formation extending longitudinally on the neck portion in the Z direction; and
 a first ramp member and a second ramp member positioned on the shoulder portion, the first ramp member positioned radially between the first lug portion and the second lug portion; and the second ramp member positioned opposing the first ramp member and positioned radially between the second lug member and the first lug member; and
 the first ramp member and the second ramp member each having a ramp extending from the shoulder portion higher in elevation, in the direction of the longitudinal axis, away from the shoulder portion and ending in a shoulder stop portion extending from the shoulder portion in the direction of the longitudinal axis.

7. The filter cartridge of claim 6 wherein the shoulder stop portion of the first ramp member is positioned radially 180 degrees about the longitudinal axis from the shoulder stop portion of the second ramp member.

8. The filter cartridge of claim 7 wherein the shoulder stop portion of the first ramp member is positioned radially less than 90 degrees about the longitudinal axis from the neck stop surface of the first lug portion.

9. The filter cartridge of claim 6 wherein the shoulder stop portion of the first ramp member is positioned radially less than 90 degrees about the longitudinal axis from the neck stop surface of the first lug portion.

* * * * *